Feb. 4, 1969  R. H. GRAHAM ET AL  3,426,174
ELECTRON REFLECTION SEAM TRACKER

Filed Dec. 9, 1965  Sheet 1 of 3

*INVENTORS*
RICHARD H. GRAHAM
EDWARD C. WINGFIELD
BY
*Sandoe Neill Schotler Weister*
ATTORNEYS

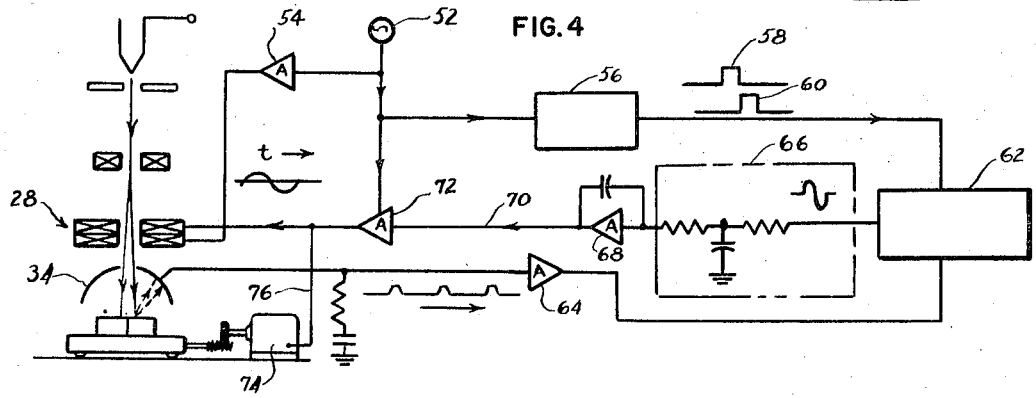
FIG. 4
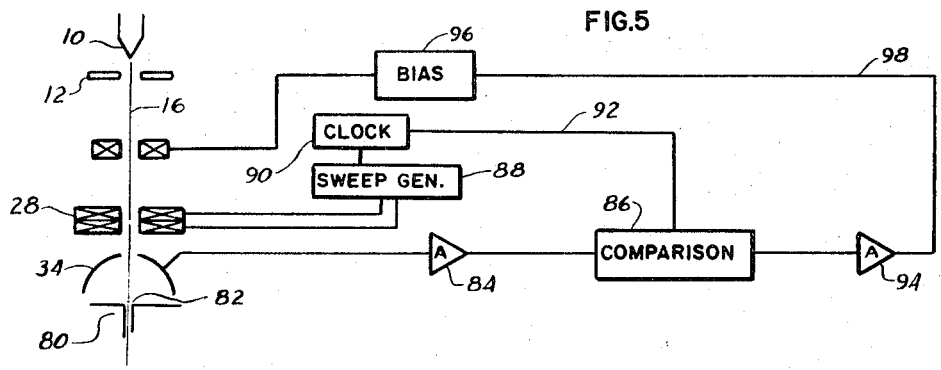
FIG. 5
FIG. 6
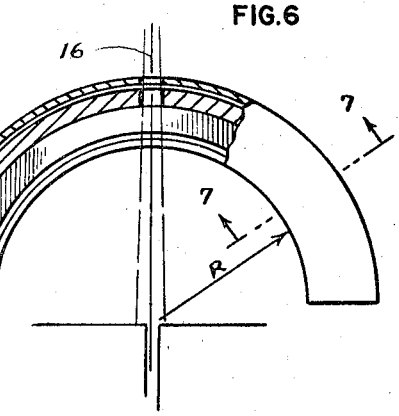
FIG. 7
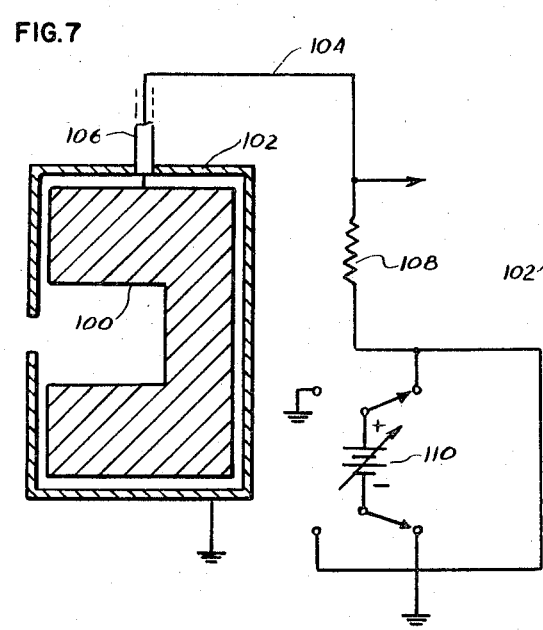
INVENTORS
RICHARD H. GRAHAM
EDWARD C. WINGFIELD
BY
ATTORNEYS

INVENTORS
RICHARD H. GRAHAM
EDWARD C. WINGFIELD

BY

ATTORNEYS

United States Patent Office

3,426,174
Patented Feb. 4, 1969

3,426,174
ELECTRON REFLECTION SEAM TRACKER
Richard H. Graham, Glastonbury, and Edward C. Wingfield, Wethersfield, Conn., assignors to United Aircraft Corporation, East Hartford, Conn., a corporation of Delaware
Filed Dec. 9, 1965, Ser. No. 512,630
U.S. Cl. 219—121                10 Claims
Int. Cl. H05b 7/18

ABSTRACT OF THE DISCLOSURE

A device is described for tracking and welding a seam formed between abutting workpieces to be welded along the seam by a beam of electrons wherein a detector is used which provides a voltage in response to reflected electrons generated by a beam impinging upon the workpieces in the vicinity of the seam. The beam cross-sectional size is commensurate with the separation of the workpieces along the seam for at least partial entry of the seam by the beam. The beam is deflected over the surface of the workpieces across the seam to generate a detectable pulse from the detector corresponding to the entry of the seam by the portion of the beam and the thus amplitude modulated detector voltage is combined with a signal representing the deflection voltage to produce a signal representative of the deviation in time between the pulse in the detector voltage and a recurring value in the deflection voltage corresponding to a desired position of the seam. Thereupon the beam and the seam are moved relative to one another either by movement of the workpieces or by deflection of the seam to bring the beam directly onto this seam.

---

This invention relates generally to electron beam equipment and, more particularly, relates to an improved arrangement for the detection of bulk discontinuities in the workpieces of such equipment and the utilization of bulk discontinuities for the generation of information signals useful in control of such electron beam apparatus.

In electron beam equipment, electrons accelerated through high potentials impinge upon the workpiece in order to perform various working functions thereon such as, for example, welding of abutting workpieces along a seam. In such equipment, it is usual to provide a controllably movable workpiece stage to permit adjustment of the workpieces with respect to the gun. In addition, the position of beam impingement is usually controllable (though the positional adjustment is of smaller amplitude) by deflection coils or plates.

It is necessary, however, to have certain information concerning the impingement position in order to properly control the electron beam processing. For example, when welding along a seam, it is necessary to provide information so as to permit control over the deflection of the electron beam to ensure coincidence of the seam and the impingement position of the beam.

Optical observation of the impingement position has been used. However, with optical observation of the impingement position, certain difficulties have been encountered. Among these is the difficulty of maintaining clarity of the optical system over periods of use. In high energy beam apparatus, volatilized material from the workpiece deposits on the optical components, obscuring the image after relatively short periods of operation. Other types of seam trackers have been proposed. However, these usually require ancillary processing, such as painting precise reflective guide lines along the seam, which introduces added processing costs and reduces equipment capability.

In electron beam apparatus, the electron back-scatter has been utilized to provide information signals. Electron back-scatter generally is composed of two elements. The first contribution to the total effect of back-scatter is provided by a secondary emission which is a low energy electron emission (below 50 ev.). The remaining contribution is provided by higher energy secondary emissions which are called reflected electrons. For the purpose of this specification, electrons having an energy below 50 ev. will be called secondary electrons and those with higher energies will be termed reflected electrons although it must be recognized that in practice, the boundary cannot be defined quite this precisely.

For example, in connection with the surface studies of opaque conductors by electron microscopes, use has been made of the electron back-scatter from the primary electron beam impinging on the surface and displaying the back-scatter as visual display for observation. Contrast of the visual display indicative of variation in specimen surface conditions is attained by utilizing differential back-scatter from different points on the surface during scanning thereof.

In electron beam microscopy, secondary emissions are depended upon in order to obtain the desired surface contrast because electron secondary emission shows a dependence upon primary beam-to-surface angle which is used to enhance the contrast in the scanning microscope.

The direct application of this technique to control electron beam apparatus for working materials has been attempted. However, such applications have not been as successful as desired. For example, a surface scratch on the work specimen will often provide the same contrast as the seam. Thus, control of the impingement position of a welding beam in response thereto is ambiguous and control fails.

However, when the back-scatter is composed primarily of reflected electrons, it has been found that the high speed electron emission current is relatively independent of the angle between the reflecting surface and the primary beam. Further, it has been found that when a beam is scanned over the surface of a workpiece, bulk discontinuities (such as a seam or hole having a high depth-to-width ratio) can be detected from the back-scatter of the reflected electrons with rather high suppression of the detected signal variation due to surface variations. It should also be noted that it has proven experimentally possible to detect the seam signals even when there is no line of sight path between the seam and the detector. This is due to multiple scattering of electrons from the chamber walls.

It is, therefore, a primary object of the present invention to provide an improved apparatus for the detection of bulk discontinuities in a workpiece by means of an electron beam and to generate a control signal in response thereto.

It is a further object of this invention to provide an improved arrangement for the generation of a control signal responsive to bulk discontinuities and control means responsive to such signal to control the impingement position of such beam.

In addition to detection of seams, the signal generated by bulk discontinuities may be used for the purpose of generating information and control signals. For example, by using calibrated discontinuities, information concerning the diameter of the beam can be obtained. This information signal can be utilized to control the focusing coils of the electron beam apparatus. Similarly, information concerning the outline irregularity of the beam can be obtained from calibrated bulk discontinuities.

It is, therefore, another object of the present invention to provide an improved method and apparatus for the generation of information signals from bulk discontinuities in a workpiece in order to generate control signals for control of electron beam apparatus.

In accordance with these objects, there is provided, in a preferred embodiment of this invention, a scanning beam comprising a focused, collimated beam of electrons. The electron beam is of reasonably high speed (falling through a typical acceleration potential of 100 kev.) but is of an intensity below that utilized for working of the material. Means are provided to sweep the electron beam across the surface of interest on the workpiece. Detector means are provided to collect the reflected electrons backscattered from the surface of the workpiece. As the sweeping beam encounters a bulk discontinuity, the backscattered electron current will drop, due to the Faraday cup effect of a bulk discontinuity on back-scatter. This information signal may then be utilized for beam deflection or beam focusing techniques.

For example, the information signal may be conveniently coupled as the error signal in a servo loop to align the seam with a second electron beam of welding intenity so that the welding beam precisely and accurately tracks the seam during welding without the necessity of optical observation of the workpiece. Alternatively, a bulk discontinuity of known dimension may be utilized to give information about the beam diameter, in which case the information signal may be utilized to control current in the focusing coil. This technique may be used in a more sophisticated manner by rotation of an extending bulk discontinuity about a point coincident with the impingement position of the beam. The information signal generated will, therefore, provide information related to the angular displacement of the calibrated bulk discontinuity, thereby to provide information concerning the symmetry of the impinging electron beam about the center of rotation.

Preferably, the detector is constituted as a hemispherical or other body subtending $2\pi$ radians centered on the position of impingement of the scanning beam, thereby to suppress amplitude variation in the backscatter due to changes of angle of incidence of the beam and increasing the information dependent upon the existence of bulk discontinuities. In some applications, however, such as out-of-vacuum working of materials, a planar detector may be utilized to simulate hemispherical coverage and provide an acceptable information signal.

Having briefly described this invention, it will be described in greater detail along with other objects and advantages in the following portions of the specification, which may best be understood by reference to the accompanying drawings, of which:

FIG. 4 is a schematic diagram showing a typical system for position control using the apparatus of FIG. 1;

FIG. 5 is a schematic diagram of a typical system for beam control using the apparatus of FIG. 1;

FIG. 6 is a broken away elevation view of another embodiment of the detector useful in the practice of the present invention;

FIG. 7 is a cross sectioned view partially in schematic form of the detector shown in FIG. 6;

Figure 1:
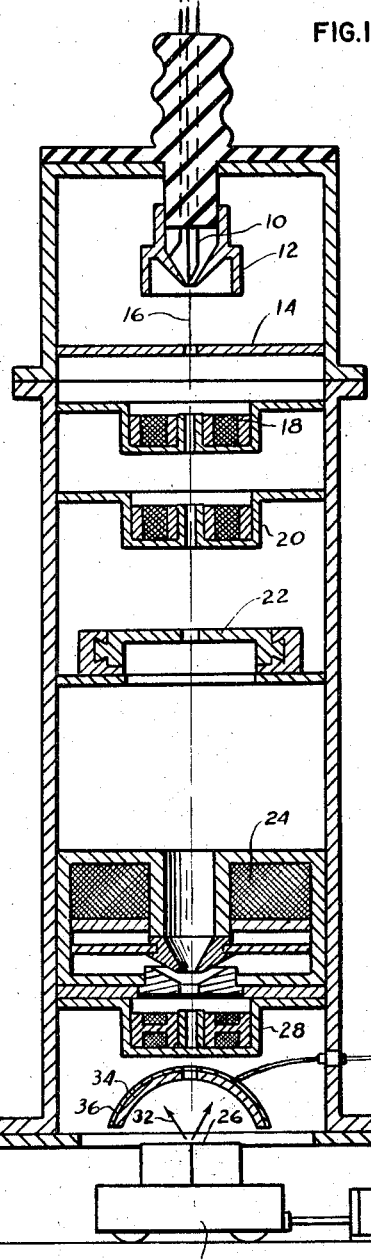
FIG. 1 is a cross sectioned elevation view of an apparatus in accordance with the present invention.

In FIG. 1, there is shown a typical electron beam welder having an electron gun consisting of a filament cathode 10, a grid electrode 12 and an anode electrode 14. The filament is heated to generate a cloud of electrons which is accelerated by the cathode-anode potential. The grid 12 is biased to control the intensity of the generated electron beam. The electron beam 16 then passes through alignment coils 18 and 20 and through an aperture plate 22 which limits the beam path to the aperture. A magnetic lens 24 is so positioned and the field intensity thereof is so controlled as to focus the beam 16 upon the workpiece 26. The position of impingement can be controlled by the deflection coils 28. The workpiece is mounted on a table 30 which can be moved in the plane of the paper and in a plane perpendicular to the paper by conventional tracking means not illustrated in detail.

As the impinging beam strikes the workpiece, electrons 32 will be backscattered from the workpiece, which electrons are collected on the hemispherical detector 34. A shield 36 may be provided on the outer surface thereof to shield the detector from stray electrons as, for example, backscattered from an adjacent welding beam. Leads 38 are provided to bring the derived signal on the detector to the outside of the welding equipment through the wall of the vacuum chamber.

Figure 2A:
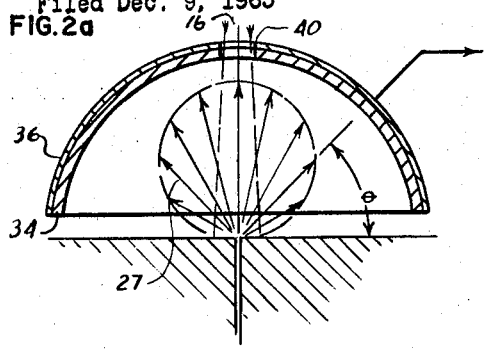
FIG. 2a is a partially sectioned view to enlarged scale of the detector in FIG. 1 showing the backscatter pattern and FIG. 2b is a diagrammatic view of the detector illustrating the factors involved in the derivation of Equation II.

The $2\pi$ detector is shown in greater detail in FIG. 2a and consists of a hemispherically shaped detector surface 34. The surface is developed as a body of rotation of radius R swung from a center corresponding to the central position of the impinging beam as it passes through the aperture 40. The aperture 40 must be sufficiently wide to permit the desired scanning by the electron beam 16, illustrated in its central position and extremes of deflection during scanning.

Figure 2B:
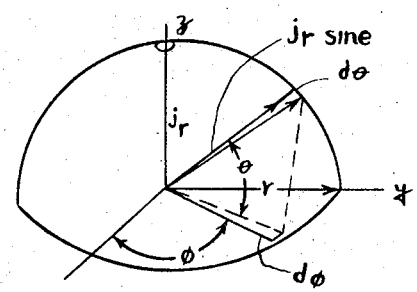

It has been found that the secondary emission consists to a substantial degree of electrons of the reflected type. These high speed reflected electrons travel in the straight lines from the surface of the workpiece to the detector as illustrated by the arrows 27 and the angular dependence amplitude of reflected electron current as a function of the angle between the surface and the current density vector is very closely approximated by Equation I:

$$j = j_r \sin \theta$$

where:

$j_r$ = max. current density vector at radius $r = Cr_0^2/r^2$
$j$ = reflected current density vector
$\theta$ = angle between the surface and the reflected current density vector
$C$ = a constant for a given beam current and target material and
$r_0$ = radius of beam spot on the target surface If the detector is a hemisphere of radius $r$, the element of current at the detector surface is $di = j\, dA$. Assume $r \gg r_0$ where $dA$ = element of hemisphere surface (see FIG. 2b)
Area = $r^2 \cos\theta d\theta d\phi$
and
$j = j_r \sin \theta$ from Equation I
then
$di = j_r r^2 \sin \theta \cos \theta d\theta d\phi$ where $\theta$ and $\phi$ are the radius vector coordinate angles in spherical coordinates
and $$i = j_r r^2 \int_{\theta_0}^{\pi/2} \int_0^{2\pi} \sin \theta \cos \theta d\theta d\phi$$

$i = \pi j_r r^2 [1 - \sin^2 \theta_0]$

Equation II: $i = \pi j_r r^2 [\cos^2 \theta_0]$ where $\theta$ = the obstruction angle formed if the detector is not a full hemisphere.

Currents intercepted by non-hemispherical coaxial detectors may be determined by projecting their areas into an equivalent hemisphere and solving Equation II. A cylindrical detector is an example of this type. By generating a surface formed by rotating the radius vector $r$ (from the center of any hemisphere to the outer edge of the non-hemispherical detector), that portion of any hemisphere surface enclosed by the intersection of the two surfaces is the equivalent hemisphere of the non-hemispherical detector and Equation II applies for circularly symmetrical coaxial planar detectors. Other shapes or orientations must be analyzed individually.

The intensity distribution given by Equation I holds for reflected electron backscatter and is substantially independent of changes in the angle of incidence between the beam and the surface. This is quite unlike the case of secondary electron emission which may show a high dependence on beam-surface angle and is used in scanning microscopes for the enhancement of contrast of surface variations.

Figure 3A:
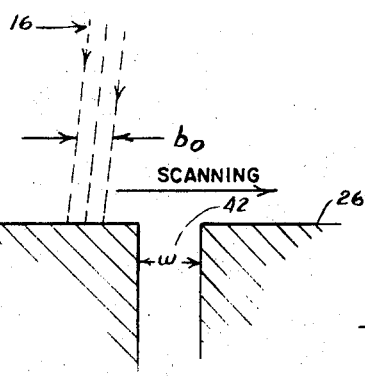
FIG. 3a is a cross sectioned view to enlarged scale of a bulk discontinuity useful in explanation of the detector signal variation in the discontinuity and FIG. 3b is a plot of detector response at the bulk discontinuity.

As can best be shown in FIGS. 3a and b, the scanning beam 16 is swept across a bulk discontinuity 42 of the workpiece 26, as indicated by arrow 44. A bulk discontinuity may, for example, consist of the space between abutted workpieces along which the weld seam is to run.

As the scanning electron beam 16 impinges upon the bulk discontinuity, the current intensity of the reflected electrons will drop from the intensity at the workpiece surface to a minimal value as represented by the plot 46 in which reflected current intensity is plotted against time and in which the base line 48 corresponds to the reflected signal from the surface and the minimal signal is represented by the line 50. Under the conditions set forth in the drawing, the reflected electron intensity drops substantially to zero because of the Faraday cup effect of the bulk discontinuity. This effect is known and is explained by the absorption of substantially all of the reflected electrons within the walls of the bulk discontinuity. Thus, the backscattering from the surface drops to substantially zero at the discontinuity, constituting 100% amplitude modulation of the backscatter.

It can be seen, therefore, that the beam will track only bulk discontinuities. Thus, surface scratches on the workpiece surface, which are almost inevitably present in practical welding situations, will not cause the significant variation in the detector output signal caused by a bulk discontinuity.

Figure 3B:
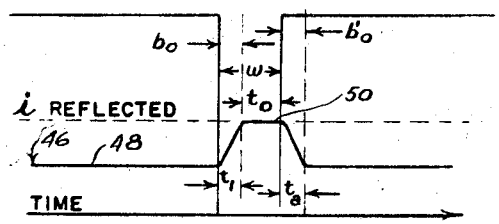

The example given is the ideal situation in which the beam is substantially smaller than the dimensions of the bulk discontinuity. If the beam is wider than the bulk discontinuity as, for example, because the beam is used in out-of-vacuum welding applications, the signal variation will not be as great as that set forth in FIG. 3b. However, a signal due to backscatter amplitude modulation will still exist since a portion of the beam enters the bulk discontinuity and thus generates an information signal. The limits of detectability of the signal variation will depend in large measure on the application intended. For example, if the signal variation is lower than the noise level, detection can be made only by rather sophisticated comparison techniques. These may be useful in some applications where the scanning information is processed upon tapes which then control the welding beam at a later time. If control is to be immediate, however, such techniques are often too time consuming to be practical.

The information signal may be utilized for positioning of the workpiece with respect to a welding beam adjacent to and aligned with the scanning beam by utilizing the circuitry of FIG. 4.

In FIG. 4, there is shown apparatus of FIG. 1, including the detector 34 and the beam deflection coils 28. A clock oscillator 52 is provided to serve as a source of reference signals. The clock signals are amplified by amplifier 54 and applied to one side of the coils 28. It should be noted that the $y$ axis scan and the servo error signal may be applied to the same $y$ axis deflection coil. The same clock output signal is provided to trigger a logic gate generator 56 to generate the sampling pulses 58 and 60 applied to the time selector 62. The selector is tripped by the sampling pulses to sample the "scan" signal from the detector 34 after amplification by amplifier 64. The clock is related to the undeflected beam position so that, if the seam is aligned with the undeflected position of the beam, the signal samples will be identical and no resultant difference in signal will be generated. The gated signals are then processed by the integrator 66 and amplified by amplifier 68 to develop an error signal on lead 70 which is amplified by amplifier 72 and applied to the deflection coils 28 in the opposite sense to the error signal. The same error signal is used to drive the servo motor 74 via lead 76 to position the workpiece so that the bulk discontinuity is aligned with the undeflected position of the incident beam. Thus, both mechanical movement of the stage and deflection of the beam are coincidentally employed for alignment. This permits rapid followup and wide scale deflection. The servo arrangement is considered conceptually conventional and other types of servo systems may be utilized.

Alternatively, bulk discontinuity detection may be utilized to develop information concerning the electron beam itself, which information may be provided in the form of the signal used to control the electron beam apparatus.

For example, the circuitry shown in FIG. 5 may be utilized for the development of information signals concerning the focus of the electron beam and used to control the focus conditions of the beam.

In FIG. 5, there is shown the electron beam apparatus consisting of a cathode 10 and an anode 12 to accelerate the electron beam 16 until it impinges upon a workpiece 80 having a calibrated bulk discontinuity or slit 82 therein. In this sense, and as used generally throughout this specification, the term workpiece is applied to any object on which the beam impinges, such as a calibrated specimen used for information signal generation, and is not restricted solely to an object to be welded. The bulk discontinuity may be a slit, the dimensions of which are accurately measured. A detector 34 is arranged above the impingement position and the detector signals are amplified by an amplifier 84 for application to a comparison circuit 86. A beam is swept across the calibrated slit by the deflection coils 28 energized by a sweep generator 88 running off a master clock 90. The clock signals are also applied to the comparison circuit over lead 92 so as to provide a timing base signal coincident with that used to control the sweep generator. The comparison circuit is provided to compare the width of the detected signal with a signal whose width is predetermined from the beam velocity, the slit width and the desired beam diameter under proper focus conditions. If the beam is properly focused, the detected signal width will coincide with the predetermined signal width. If, however, a difference exists, the difference can be used as an error signal which is amplified and rectified to direct current by the amplifier 94. A DC bias source 96 is serially coupled with the output from amplifier 94 by insertion in lead 98 to provide the steady state focusing current to the lens to which current is added or from which current is subtracted the error signal from amplifier 94 for continuous focusing control of the beam. Alternatively, if a minimum diameter beam is desired, the circuit may simply maximize the signal time derivative, to give the largest change in current per unit time.

Thus, with the circuit of FIG. 5, a calibrated bulk discontinuity is utilized to generate an information signal dependent upon the size of the beam spot as it impinges upon the workpiece. Comparison of the spot size with the predetermined spot size for proper focus can, thus, be utilized for generation of an error signal applied to the focusing coil for automatic focusing of the beam.

In general, this technique is most useful for developing information about the welding beam per se. Thus, the workpiece with the calibrated slit should be selected from material having a low Z (atomic number) and the high intensity welding beam should be scanned very rapidly. By positioning (either manually or automatically) the slit or iris at the edges of the beam current distribution, a continuous monitoring and/or control of both beam focus and location may be achieved for weld beams, without slit or iris destruction.

The workpiece may be adjustably positioned within the electron beam apparatus so as to develop information concerning the beam characteristics at various points along the beam path if desired.

Similarly, although most useful with lower powered beams, the use of calibrated slits may be employed for studies of any electron beams. For example, lens aberrations may be studied by providing a slit of the same dimension as the desired beam diameter. The slit may then be rotated and the beam caused to impinge upon the slit at increments of rotation of the slit. The signals developed will, thus, be information signals related to deviations of the beam from its desired roundness at angular increments of rotation of the slit. This information may be used directly in the analysis of lens aberrations.

The circuitry of both FIGS. 4 and 5 may be utilized as calibration circuitry for operating electron beam equipment so that the operating equipment may be employed not only to determine the position of bulk discontinuities on the workpiece, but may also be used to measure the relative dimensions of such bulk discontinuities with respect to the calibrated dimensions.

As can be seen from Equations I and II, the ideal detector shape is a hemisphere with the impingement position coincident with the center of the hemisphere. In some applications, however, a detector which subtends a solid angle which is less than $2\pi$ radians may have certain practical advantages and may, under some conditions, be capable of providing the desired detector output. For example, in FIGS. 6 and 7, there is shown a semi-circular detector which is useful in suppressing angular variations in one plane.

In FIGS. 6 and 7, there is shown the incident beam 16. The detector 100 is in the form of a semicircle of radius R, the center of which is coincident with the undeflected beam position. The surface of detector 100 is constructed as a Faraday cup in order to improve its efficiency in collecting all of the electrons which reach the surface from the backscatter. In this manner, the surface will not itself be a source of backscattered electrons which would increase the noise of the detector system and, thus, degrade performance. The detector 100 is preferably shielded by a grounded shield 102 to eliminate an output signal from random electron movement within the vacuum chamber, thus, to provide the detector with a field of view directed at the impingement position of the beam. The detector signal may be transmitted over lead 104 having coaxial grounded shielding 106 and developed across a load resistor 108. A bias battery 110 may be provided so that the detector may be biased positively or negatively to improve its collection efficiency or to reduce its collection efficiency as dictated by the application intended.

It will be recognized by those skilled in the art that various detectors having a surface intermediate between a semicircle and a hemisphere may be utilized with varying degrees of efficiency in different applications when the mechanical shape of the detector must be changed in accordance with the requirements of the specific application.

Figure 8:
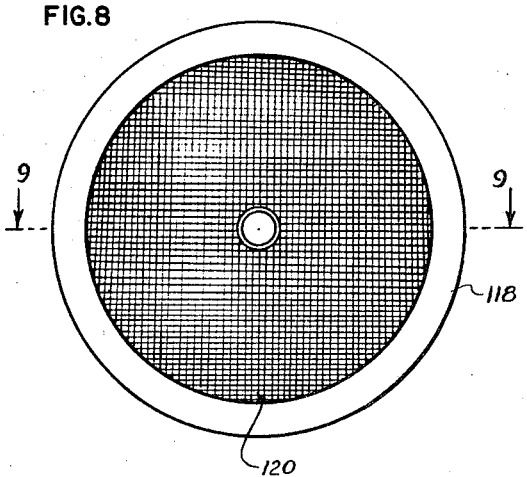
FIG. 8 is a plan view of a planar detector useful in the practice of the present invention.
Figure 9:
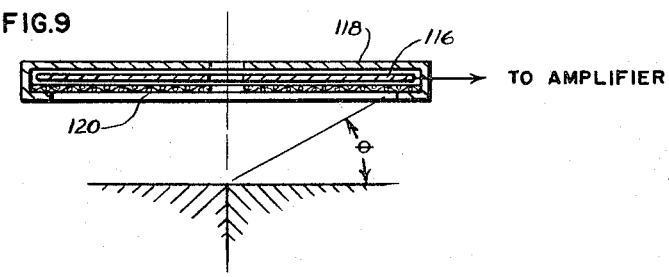
FIG. 9 is a cross sectioned view along lines 9—9 of FIG. 8.

In some applications, particularly "out-of-vacuum" work in which the electron beam exits from the vacuum of the generator and proceeds through ambient atmospheric pressure before impingement on the workpiece, the system requirements preclude using hemispherical or even semicircular detectors. In such applications, a planar detector is desired to decrease the space between the avacuated container and the workpiece and thus reduce beam spread by the atmosphere. In these applications, a planar detector may be constructed having a detector surface which will simulate the effect of a hemispherical surface and, thus, will serve to reduce the angular variation of the output signal thereby to make the output signal responsive to bulk discontinuities in a manner similar to a hemispherical detector. A planar detector of this nature is shown in FIGS. 8 and 9.

The detector consists of an insulated disc 116 symmetrical with the beam port 114, surrounded by a shield 118 and a Faraday cage shield 120 across the detector window. The detector surface may be covered by a low Z (atomic number) element such as carbon to reduce backscatter from the detector surface itself.

The detector shown has a radius equal to the distance from the workpiece and is, thus, equivalent to a hemispherical detector with a 45° obstruction angle by Equation II.

Therefore, if the detector window is made in the form of a circle, the unit has a beam-surface angle compensated geometry. The design is useful in those cases where the hemisphere or semicircular detectors cannot be placed close to the workpiece. It should be noted that in the detector shown, the circular shape provides compensation for all types of surface roughness. In some cases, the surface scratches and machining marks are known to lie parallel to a single plane. In those cases, a simplified version of the planar detector may be utilized using only a flat strip detector placed perpendicular to the surface ridges and machining marks. This reduces the necessary size of the detector surface, but limits the application to that specified.

Under the precise conditions specified, the strip detector may be formed as a linearly developed Faraday cup type detector (e.g. the Faraday cup illustrated in FIG. 4 but extending linearly). Under such conditions, the spatial changes of the reflected electron vector array will not significantly influence the detector response.

Figure 10:
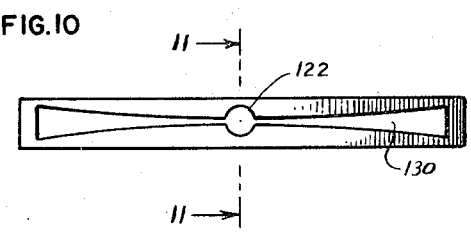
FIG. 10 is a plan view of a second planar detector.
Figure 11:
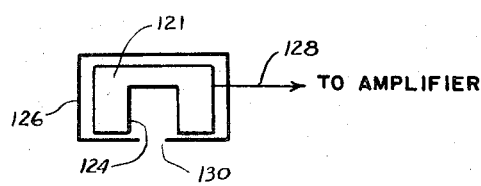
FIG. 11 is a cross section taken on lines 11—11 of FIG. 10.

Usually, however, it is not possible to satisfy the conditions precisely and the detector shown in FIGS. 10 and 11 may advantageously be employed.

In FIGS. 10 and 11, there is shown a linear detector 121 extending linearly from a center beam port 122. The detector is developed as a Faraday cup having a U-shaped detector surface 124 enclosed within shield 126. A shielded lead 128 is used to derive the signal from the detector surface. The shield is provided with a window 130 exposing the detector surface to the reflected electrons.

The window is shaped to provide compensating geometry to give an effective detector surface geometry so that the response therefrom is related to changes in the total electron backscatter and independent of changes in the spatial orientation of the backscatter pattern. For this purpose, the window width is varied in accordance with Equation III.

Equation III:

$$\omega = (\Delta\phi) y \sec \theta = \sqrt{y^2 + h^2}\, \Delta\phi$$

where:

$\omega$ = width of window at distance $y$ from origin (center of beam port)
$h$ = distance of detector from workpiece surface $$\theta = \tan^{-1} \frac{h}{y}$$

$$\Delta\phi = \tan^{-1} \frac{\omega_0}{h} = \text{constant}$$

$\omega_0$ = width at beam impingement

Of course, a plurality of detector arms may be used for compensation in several planes.

This invention may be variously modified and embodied within the scope of the subjoined claims.

What is claimed is:

1. A device for tracking and welding a seam formed between abutting workpieces to be welded along the seam by a beam of electrons comprising means for generating and directing a focused beam of electrons at the seam, said beam having a cross-sectional size in the vicinity of the seam commensurate with the separation of the workpieces along the seam for at least partial entry of the seam by the beam, means for generating a periodic signal for periodic deflection of said beam across the beam facing surface of the abutting workpieces and the seam, said signal having a periodically recurring value corresponding to a desired position of the seam relative to the beam, an electron back scatter detector positioned adjacent said workpiece surface and being shaped to receive omni-directionally moving reflected electrons generated by the beam impinging on the workpiece surface to produce a detector voltage having a magnitude representative of the received reflected electrons and varying with detectable pulsed magnitude in response to the entry of the seam by at least said portion of the beam as the beam crosses the seam, means responsive to the detector voltage and the periodic signal for generating a seam position voltage representative of the deviation in time between the recurring value in the periodic signal and the pulsed part of the detector voltage, and means responsive to the seam position voltage for moving the seam and the beam relative to one another in a direction tending to reduce said seam position voltage to a minimum and place the seam in the desired position.

2. An apparatus in accordance with claim 1 in which said detector comprises a conducting hemispherical surface having an aperture therein aligned with the beam for beam passage therethrough to impinge on said seam, with the concave portion of the detector facing the seam and the center of said aperture being substantially coincident with the impingement position of an undeflected beam and the desired position of the seam.

3. An apparatus in accordance with claim 1 in which said detector comprises a semicircular surface centered upon the impingement position of the undeflected beam, and in which said detector surface is developed as a Faraday cup.

4. An apparatus in accordance with claim 1 in which said detector comprises a linear detector surface, an electron shield surrounding said detector surface, said shield having a window cut in the surface thereof facing the seam, said window extending the length of said detector and exposing said detector surface to backscattered electrons, said window being of minimum width at the point closest to the impingement position and increasing in width along a secant curve at points more distinct from said impingement position.

5. An apparatus in accordance with claim 1 wherein said relative movement means includes an amplifier responsive to the seam position voltage to vary the periodic signal to deflect the beam onto the seam.

6. A detector in accordance with claim 1 in which said detector is developed as a semicircular surface having a radius R and a center coincident with the impingement position of said beam, and in which said detector surface is developed as a Faraday cup.

7. A detector in accordance with claim 1 in which said detector is developed as a surface extending in a single plane, a shield around said detector surface and having a window exposing said detector surface to said impingement position of said beam, said window having a minimum dimension at its closest point to said impingement position and progressively widening at increasing distances therefrom along a curve equal to a constant time the distance from the origin multiplied by a secant curve.

8. A detector in accordance with claim 1 in which said detector is developed as a circular detector surface, a shield surrounding said detector surface and having a window opening in said shield along the side facing the impingement position of said beam.

9. A method for tracking and welding a seam formed between abutting workpieces to be welded along the seam by a beam of electrons comprising directing a focused beam of electrons at the workpieces and the seam with a cross-sectional shape near the seam commensurate with the width of the seam for at least partial entry thereof, collecting reflected electrons caused by the impingement of the beam onto the workpieces to generate a voltage proportional to the collected electrons, deflecting the beam across the workpieces and the seam to cause a pulse type reduction in the magnitude of the voltage generated by the collected electrons as the beam crosses the seam, comparing the pulsed voltage with a voltage representative of the deflection step to produce a voltage representative of a desired position of the seam relative to the beam, and adjusting the relative position between the beam and the seam to direct the beam at the seam for welding thereof.

10. The method as recited in claim 9 wherein the beam cross-sectional shape is adjusted less than the width of the seam to provide a high signal-to-noise ratio of the pulse in the pulsed voltage.

References Cited

UNITED STATES PATENTS

| | | | |
|---|---|---|---|
| 3,146,335 | 8/1964 | Samuelson | 219—121 |
| 3,148,265 | 9/1964 | Hansen | 219—121 |
| 3,152,238 | 10/1964 | Anderson | 250—49.5 |
| 3,196,246 | 7/1965 | El-Kareh | 219—121 |
| 3,291,959 | 12/1966 | Schleich et al. | 219—121 |
| 3,347,701 | 10/1967 | Yamagishi et al. | 219—121 |

RICHARD M. WOOD, *Primary Examiner.*

W. D. BROOKS, *Assistant Examiner.*

U.S. Cl. X.R.

219—124